US010041604B2

United States Patent
Dubus et al.

(10) Patent No.: US 10,041,604 B2
(45) Date of Patent: Aug. 7, 2018

(54) VALVE OPERATOR ASSEMBLY AND VALVE EQUIPPED WITH SUCH ASSEMBLY

(71) Applicant: Aktiebolaget SKF, Gothenburg (SE)

(72) Inventors: Jerome Dubus, Aix les Bains (FR); Christian Boch, Chambery (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/520,025

(22) PCT Filed: Oct. 20, 2014

(86) PCT No.: PCT/EP2014/072456
§ 371 (c)(1),
(2) Date: Apr. 18, 2017

(87) PCT Pub. No.: WO2016/062328
PCT Pub. Date: Apr. 28, 2016

(65) Prior Publication Data
US 2017/0314698 A1    Nov. 2, 2017

(51) Int. Cl.
*F16K 37/00*   (2006.01)
*F16K 27/04*   (2006.01)
(Continued)

(52) U.S. Cl.
CPC .......... *F16K 27/044* (2013.01); *F16K 31/508* (2013.01); *F16K 37/0041* (2013.01);
(Continued)

(58) Field of Classification Search
CPC .. F16K 27/044; F16K 31/508; F16K 37/0041; F16K 27/00; F16K 37/00; Y10T 137/8242; Y10T 137/8158
(Continued)

(56) References Cited

U.S. PATENT DOCUMENTS 3,332,438 A * 7/1967 Abdullaev .............. E21B 34/02
137/554
4,421,134 A * 12/1983 Bruton .................. F16K 3/0209
137/72
(Continued)

FOREIGN PATENT DOCUMENTS

FR           1559340 A  *  3/1969

*Primary Examiner* — John Bastianelli
(74) *Attorney, Agent, or Firm* — Bryan Peckjian; SKF USA Inc. Patent Dept.

(57) ABSTRACT

A valve operator assembly for a valve includes a valve body and an axially moveable valve translating member, a housing mounted on the valve, an input member rotatably mounted with respect to the housing, and a transmission mechanism. The transmission mechanism including a translating element connected to the valve translating member and a rotating element connected to the input member. The transmission mechanism configured to convert applied rotation of the input member into axial translation of the translating element. The valve operator assembly providing a spacing element having a tubular shape defining an axial bore through which passes the valve translating member and the translating element of the transmission mechanism. The spacing element connected by intermediate fixing means on the valve body on one end and on the housing on the other end to define cooperating mounting surfaces between the spacing element.

15 Claims, 5 Drawing Sheets

(51) Int. Cl.
*F16K 31/50* (2006.01)
*F16K 27/00* (2006.01)

(52) U.S. Cl.
CPC .............. *F16K 27/00* (2013.01); *F16K 37/00* (2013.01); *Y10T 137/8242* (2015.04)

(58) Field of Classification Search
USPC ......... 251/164, 227, 229, 264–278; 137/551, 137/554
See application file for complete search history.

(56) References Cited

U.S. PATENT DOCUMENTS

| | | | | | |
|---|---|---|---|---|---|
| 4,771,807 | A | * | 9/1988 | Karani | .................... F16K 31/05 137/553 |
| 5,620,166 | A | * | 4/1997 | Lord | ....................... F16K 31/04 251/267 |
| 2003/0033886 | A1 | * | 2/2003 | Davie | .................... F16K 41/02 73/780 |
| 2003/0038266 | A1 | * | 2/2003 | Hallden | ................ F16K 3/0254 251/266 |
| 2004/0244515 | A1 | * | 12/2004 | Cox | ....................... F16K 3/186 74/89 |
| 2005/0173667 | A1 | * | 8/2005 | Zheng | .................. F16K 3/0254 251/264 |
| 2009/0211762 | A1 | * | 8/2009 | Voss | ..................... F16K 3/0254 166/351 |
| 2014/0231685 | A1 | * | 8/2014 | Eriksen | .................. F16K 31/56 251/266 |

* cited by examiner

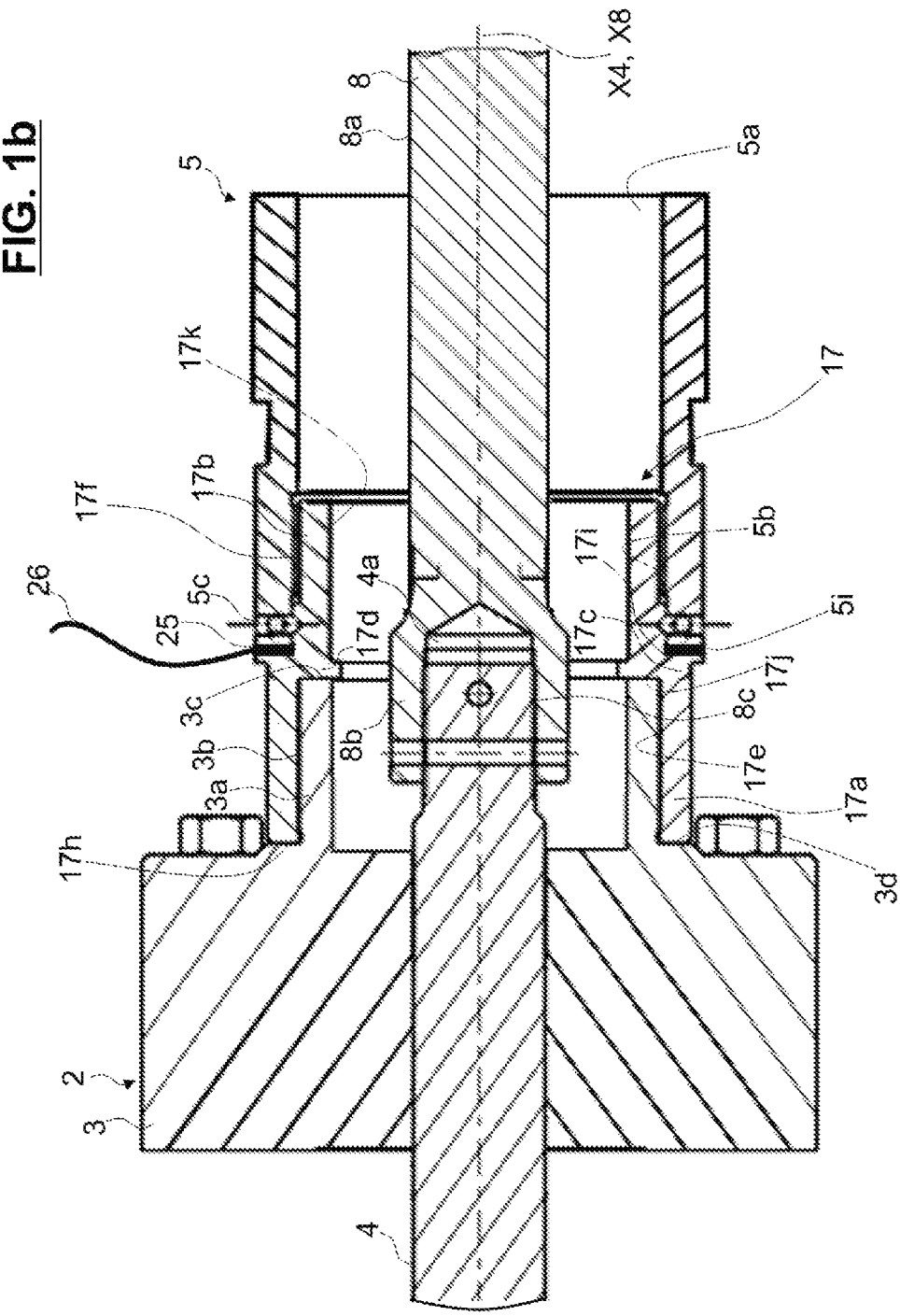

VALVE OPERATOR ASSEMBLY AND VALVE EQUIPPED WITH SUCH ASSEMBLY

CROSS REFERENCE

This is a United States National Stage Application claiming the benefit of International Application Number PCT/EP2014/072456 filed on Oct. 20, 2014, which is incorporated herein by reference in its entirety.

FIELD OF THE INVENTION

The present invention relates to the fields of valves and manually operable valves, for instance gate valves, control or regulation valves or choke valves. More particularly, the invention relates to a valve operator assembly for a gate valve.

BACKGROUND OF THE INVENTION

Valves are used in a variety of industries to control the flow of fluids. In particular, gate valves are used extensively in the oil and gas industry to control the flow of produced fluids at various stages of drilling or production. Most gate valves used in this industry comprise a valve body having a longitudinal flow bore and a transverse gate cavity that intersects the flow bore. A gate having an opening extending transversely therethrough is disposed in the gate cavity. A valve stem is provided for moving the gate between an open position, in which the gate opening is aligned with the flow bore, and a closed position, in which the gate opening is offset from the flow bore. The gate cavity of the valve body is covered by a bonnet having an axial bore through which passes the valve stem.

Such a gate valve is associated to a valve operator assembly for selectively driving the valve stem up and down in order to close and open the gate valve. A valve operator assembly generally comprises an input member to exert a rotational motion by a manual actuation by a hand-wheel or an electric or pneumatic or hydraulic actuation. The valve operator assembly further comprises a transmission mechanism to convert a rotational motion into axial motion of the valve stem. To quickly open and close the gate valve with a minimum number of turns, the transmission mechanism may be a screw mechanism, such as a roller screw mechanism, a ball screw mechanism or an acme screw with or without gear reducer, in order to reduce the operating torque.

BRIEF SUMMARY OF THE INVENTION

The transmission mechanism generally comprises a translating element connected to the valve stem and a rotating element connected to the input member, said transmission mechanisms being radially surrounded by a housing. Said rotating element may be supported in rotation and axially guided in the housing by rolling bearings.

It is known to use sensing devices in assemblies comprising moving parts in order to analyse, control and survey key parameters of said parts. Sensing devices are powered by external power supply means and data are transmitted to control means. The knowledge of the level and variations of such parameters allows quantifying the assembly efficiency, the wear and degradation of parts and ensuring a better management of preventive maintenance.

However, it is highly complex to integrate sensing devices within a valve operator assembly. The constituting parts are all in rotation and/or translation movement which are not suitable for the integration of sensing device cables used for powering and data transfer.

The sensing device is installed between mounting surfaces and then is located at specific force transmission paths.

Another solution could be the integration of sensing devices between the housing and a fixed part of rolling bearings that support the rotating element of the transmission mechanism. However, it necessitates providing the housing with passage means, for instance through-openings, for the cables passage. The disadvantage of such integration is that it induces additional manufacturing steps, sealing means for the cable passage have to be integrated, and then it increases the costs of the housing manufacturing.

It is therefore a particular object of the present invention to overcome these aforementioned drawbacks by providing an instrumented valve operator assembly of simple design that is easy to assemble, economical, able to operate for a long time in both an effective and an economic manner.

The invention concerns a valve operator assembly provided for a valve comprising a valve body and a valve translating member axially moveable, the valve operator assembly comprising a housing adapted to be mounted on the said valve, an input member rotatably mounted with respect to said housing, and a transmission mechanism comprising a translating element adapted to be connected to the valve translating member and a rotating element connected to the input member, said transmission mechanism being adapted to convert applied rotation of the input member into axial translation of said translating element.

According to the invention, the valve operator assembly further comprises a spacing element having an almost tubular shape defining an axial bore through which passes at least partly the valve translating member and the translating element of the transmission mechanism. The spacing element is adapted to be directly connected or indirectly connected by intermediate fixing means on the valve body on one end and on the housing on the other end so as to define cooperating mounting surfaces between said spacing element, the valve body and/or the intermediate fixing means and between the spacing element, the housing and/or the intermediate fixing means. The valve operator assembly further comprises at least one sensing device on one of said mounting surfaces.

According to further aspects of the invention, which are advantageous but not compulsory, such a valve operator assembly may incorporate one or several of the following features as long as there is no contradiction:

The transmission mechanism is a screw mechanism, wherein the translating element is a screw with a threaded outer surface and the rotating element is a nut with a threaded inner surface.

The transmission mechanism is a screw mechanism, wherein the translating element is a nut with a threaded inner surface and the rotating element is a screw with a threaded outer surface.

The transmission mechanism is a roller screw mechanism wherein rollers are provided between the screw and the nut. Alternatively, the transmission mechanism is a ball screw mechanism wherein balls are provided between the screw and the nut.

The input member is an operable hand-wheel. Alternatively, the input member is a mechanical operator or a remote operating vehicle.

The input member is directly connected to the rotating element. Alternatively, an adapter sleeve is axially mounted between the input member and the rotating element.

The valve operator assembly comprises at least one bearing radially mounted between an outer surface of the rotating element and an inner bore of the housing.

The spacing element comprises a tubular portion defining a first mounting surface cooperating with a tubular portion defining a second mounting surface of the housing so as one of the tubular portions is radially surrounding the other in order to ensure an axial guidance.

The mounting surface of the tubular portion of the spacing element is provided with a thread cooperating with an associated thread provided on the mounting surface of the tubular portion of the housing.

The thread of the spacing element is provided on an external cylindrical surface of the tubular portion and the thread of the housing is provided on an inner cylindrical surface of the tubular portion inner bore of the housing.

The thread of the spacing element is provided on an inner cylindrical surface of the tubular portion and the thread of the housing is provided on an outer cylindrical surface of the tubular portion of the housing.

The spacing element or the housing comprises a radial portion forming an axial stop for the tubular portion of the housing or the spacing element respectively. The axial stop defines a radial mounting surface against which bears an almost radial mounting surface ending the tubular portion.

The spacing element comprises at least a recess wherein are engaged screws passing through radial threaded holes provided on the housing.

The recess of the spacing element consists in an annular groove.

The spacing element comprises a first radial annular flange defining a first radial mounting surface and the housing comprises a second radial annular flange defining a second radial mounting surface, both flanges bearing against each other.

The two flanges of the spacing element and the housing are bearing against each other along radial mounting surfaces.

The two flanges of the spacing element and the housing are connected together by a plurality screws such as each screw comprises a head defining a radial mounting surface bearing against a radial mounting surface defined on one of the flanges.

The two flanges of the spacing element and the housing are in close vicinity or in direct contact and are connected together by an annular retainer ring comprising an inner groove wherein the two flanges are engaged and axially blocked.

The annular retainer ring is split in two parts connected together by any appropriate means, for example by screws.

The annular retainer comprises passage means, for instance a through-opening, for enabling the passage of cables connected to the sensing device.

At least one the flanges provided on the housing and/or the spacing element consists in an annular ring connected to the outer periphery of said housing and/or spacing element.

The sensing device has an almost annular shape.

The sensing device is integrated between two radial mounting surfaces that are outwardly opened to free space, permitting an easy assembly and easy access for a cable connection.

The sensing device is integrated between one mounting surface of the spacing element and one mounting surface of the housing.

The sensing device consists in an axial load cell sensor.

The sensing device consists in a torque cell sensor.

The sensing device consists in a vibration sensor from which we deduce frequency and then the velocity and the number of turns of the input.

The sensing device is connected to external means, for example power supply and control means, via at least one cable.

The invention also relates to a valve, notably a gate valve, a control or regulation valve or a choke valve comprising a valve body provided with a valve bonnet and a valve housing covered by said bonnet, a valve translating member axially moveable and a valve operator assembly according to any of the preceding embodiments. The valve translating member may be a valve stem or a piston for instance.

The valve bonnet and the spacing element are connected together by any appropriate means. In particular, the bonnet may comprise a tubular portion provided with a thread on a cylindrical surface, the said thread cooperating with an associated thread provided on a cylindrical surface of the spacing element. Alternatively, the valve bonnet and the spacing element may be glued, welded or connected by screws and bolts passing through openings. The radial and axial surfaces of the spacing element and the bonnet which are bearing against each other define mounting surfaces.

According to a further aspect of the invention, the valve comprises at least one sensing device on a mounting surface between the spacing element and the bonnet.

Thanks to this invention, the sensing device is set between two fixed parts which are easily accessible for assembly and for the cable passage. Standard valve operator assemblies can be instrumented without any structural modification.

Another advantage is that data can be directly collected within the valve operator assembly and throughout its service life. Live data acquisition and analysis permits a more efficient maintenance process since failure can be early detected or prevented before serious damage.

BRIEF DESCRIPTION OF THE SEVERAL VIEWS OF THE DRAWING

The present invention and its advantages will be better understood by studying the detailed description of specific embodiments given by way of non-limiting examples and illustrated by the appended drawings on which:

FIGS. 1a and 1b are cross-sections of a valve operator assembly for gate valve according to a first example of the invention.

DETAILED DESCRIPTION OF THE INVENTION

Figure 1A:
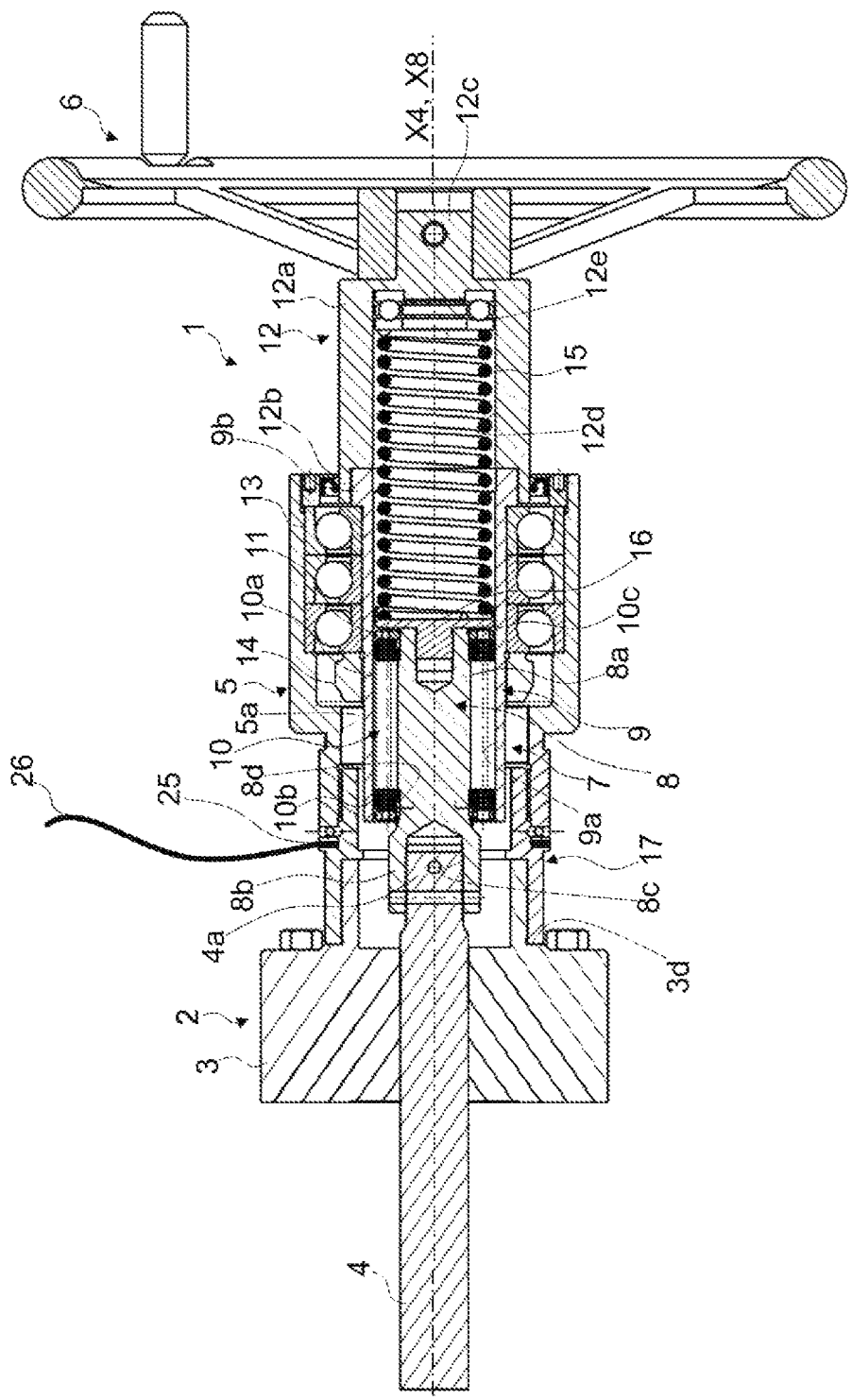
Figure 2:
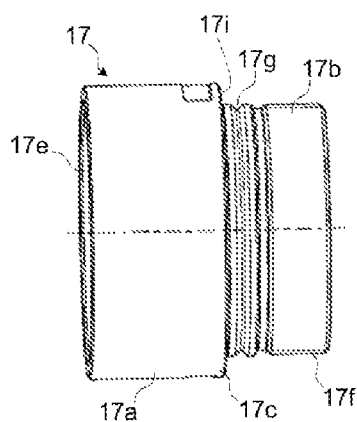
FIG. 2 is a perspective view of an intermediate spacing part valve according to the first example of the invention.

A valve operator assembly 1 as shown in FIG. 1a is adapted for a gate valve 2 provided with a bonnet 3, a valve housing (not shown in the appended drawings) covered by said bonnet and a moveable valve stem 4 of axis X4. Conventionally, the valve body has a flow bore and a transverse gate cavity that intersects the flow bore. The gate valve also comprises a gate having an opening extending transversely therethrough is disposed in the gate cavity. For more detail on such a gate valve, it could be referred to EP-B1-1 419 334 (SKF) which is hereby incorporated by reference. The bonnet 3 has a sealing function for the valve body and a fixing function between the gate valve 2 and the valve operator assembly 1.

The valve operator assembly 1 comprises a tubular housing 5, an input member 6 rotatably mounted with respect to said housing, and a transmission mechanism 7. The transmission mechanism 7 is mounted into a bore 5a of the housing 5 and is connected to the input member 6 on one end and to the valve stem 6 of gate valve 2 on the other end. The transmission mechanism 7 is then axially interposed between said input member 6 and said valve stem 4 to convert a rotational motion of the input member 6 into axial motion of the valve stem 4. In the illustrated example, the bore 5a has a stepped form.

In the example illustrated in FIG. 1a, the transmission mechanism 7 is an inverted roller screw mechanism comprising a screw 8, a nut 9 and rollers 10. The screw 8 has an axis X8 coaxial with the axis X4 of the valve stem 4, and is provided with a threaded outer surface 8a. The nut 9 is mounted coaxially about the screw 8 and is provided with a threaded inner surface 9a. A plurality of longitudinal rollers 10 is disposed radially between the screw 8 and the nut 9.

The screw 8 extends longitudinally through a cylindrical bore of the nut 9 on which the threaded inner surface 9a is formed. The nut 9 has a tubular form and is elongated to accommodate the full extent of screw travel. Axially on the side opposite to the input member 6, a recess 8c is formed on a frontal radial surface of an end 8b of screw 8 and into which is fixed an end 4a of the valve stem 4 of the gate valve 2. The valve stem 4 and the screw 8 are connected by any appropriate means, for example by threads, welding, glue, a clamp and/or a pin.

The rollers 10 are identical to each other and are distributed regularly around the screw 9. Each roller extends along an axis which is coaxial with the axis X8 of the screw 8 and comprises an outer thread 10a engaging the thread 9a of the nut 9 and the thread 8a of the screw 8. Each roller 10 also comprises, at each axial end, outer gear teeth 10b extending axially outwards the outer thread 10a and which are themselves extended axially by a cylindrical stud 10c extending outwards.

The outer gear teeth 10b are meshed by annular gear wheels 8d provided on the outer surface of the screw 8. Each annular gear wheel is axially located near to an end of the threaded outer surface 8a of the screw 8, said threaded outer surface 8a being axially located between said gear wheels 8d.

The cylindrical studs 10c on axial ends of the rollers 10 are housed in cylindrical through-recesses provided on spacer rings 11 (or annular guides). The spacer rings 11 are radially disposed between the screw 8 and the threaded inner surface 9a of the nut 9 without contacting with said thread. Each spacer ring 11 is mounted on the outer surface of the screw 8 axially next to an associated gear wheel 8d. The spacer rings 11 are hold on the outer surface of the screw 8 by any appropriate means, for example by an elastic retainer ring (not shown), so as to enable the rollers 10 to be carried and the regular circumferential spacing thereof to be kept.

The valve operator assembly 1 further comprises an adapter sleeve 12 axially mounted between the input member 6 and the nut 9. The adapter sleeve 12 comprises an axial portion 12a with an annular axial flange 12b on one end that is connected to a flange 9b at an axial end of the nut 9 by any appropriate means, for example by threads. The sleeve 12 further comprises a pin 12c that is projected axially outwards from the other end of the axial portion 12a and is connected to the input member 6.

The valve operator assembly 1 further comprises three rolling bearings 13 to guide the rotation of the nut 9 of the inverted roller screw mechanism relative to the housing 5. The rolling bearings 13 are radially mounted between the outer surface of the nut 9 and the stepped bore 5a of the housing 5. In the illustrated example of FIG. 1, the rolling bearings 13 are angular contact thrust ball bearings and are axially in contact one to another. A retaining ring 14 is secured on the outer surface of the nut 9 and axially bears against a first rolling bearing 13. Axially on the opposite side, another rolling bearing 13 is axially mounted against the flange 9b of the nut that radially extends outwards the outer surface of the said nut 9.

The valve operator assembly 1 further comprises a spring 15 axially mounted the screw 8 and the adapter sleeve 12. More precisely, the spring 15 is accommodated within the inner bore 9a of the nut and within an inner bore 12d of the adapter sleeve 12. The said inner bore 12d is provided with a stop surface 12e for one end of the spring. The screw 8 is provided with a stop plate 16 at an end on the opposite side of the end 8b into which is fixed the valve stem 4, the said plate 16 forming a stop for the other end of the spring 15. Alternatively, the valve operator assembly may not comprise such an arrangement with a spring.

According to the invention, the valve operator assembly further comprises a spacing element 17 axially mounted between the bonnet 4 of the gate valve 2 and the housing 5. A spacing element 17 according to a first example of the invention is further described in the FIGS. 1a, 1b, 2 and 3.

The spacing element 17 comprises a first tubular portion 17a and a second tubular portion 17b with different inner and outer diameters. Then the first tubular portion 17a defines an outer shoulder 17c for the second tubular portion 17b, and the second tubular portion 17b defines an inner shoulder 17d for the first tubular portion 17a.

The first tubular portion 17a is provided with a threaded inner cylindrical surface 17e that cooperates with a threaded outer cylindrical surface 3b of a tubular portion 3a of the valve bonnet 3. The threaded surfaces 17e and 3b define mounting surfaces for the spacing element 17 and the bonnet 3. The inner shoulder 17d forms an axial stop for the tubular portion 3a of the valve bonnet 3, a radial mounting surface 17j bearing against a radial mounting surface 3c ending the tubular portion 3a of the bonnet 3. Another radial mounting surface 17h ending the tubular portion 17a of the spacing element 17 bears against a radial mounting surface 3d of the bonnet. The tubular portions 17a and 3a ensure an axial guidance during the assembly of the spacing element 17 on the bonnet 3.

The second tubular portion 17b is provided with a threaded outer cylindrical surface 17f that cooperates with a threaded inner cylindrical surface 5b of the bore 5a of the housing 5. The threaded surfaces 17f and 5b define mounting surfaces for the spacing element 17 and the housing 5. The outer shoulder 17c forms an axial stop for the housing 5, a radial mounting surface 17i bearing against a radial mounting surface 5i ending the housing 5. The tubular portions 17b and 5a ensure an axial guidance during the assembly of the housing 5 on the spacing element 17.

The spacing part 17 further comprises a recess, for example an annular groove 17g, provided on an outer cylindrical surface of the second tubular portion 17b. Screws 18 are engaged within said annular groove 17g by passing through radial threaded holes 5c provided on the housing 5. Such arrangement secures the connection between the housing and the spacing element. As an alternative not shown, the spacing part 17 may comprise a plurality of recesses, each of them receiving one of the screws 18.

The spacing element 17 defines an axial bore 17k through wherein pass the valve stem 4 and the screw 8 of the transmission mechanism 7.

According to the invention, the valve operator assembly further comprises a sensing device 25.

Figure 3:
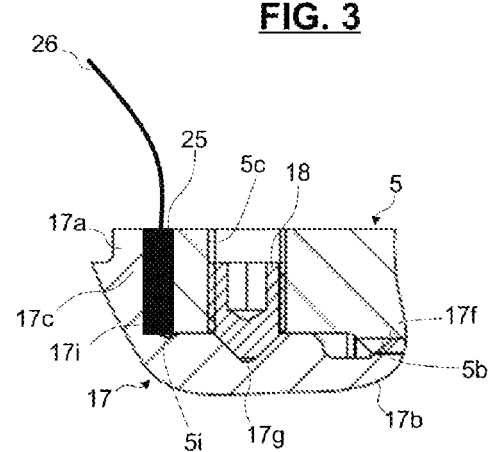
FIG. 3 is a detail view of FIG. 1, FIGS. 4a to 4c are detail views of a valve operator assembly for gate valve according to a second example of the invention.

In the first embodiment of FIGS. 1a, 1b and 3, the sensing device has an annular shape and is integrated between the radial mounting surface 17i defined by the shoulder 17d of the tubular portion 17b of the spacing element 17 and the radial mounting surface 5i ending the housing 5.

The sensing device 25 is connected to external means (not represented) such as power supply means and control means by a cable 26.

The sensing device 25 acquires some key parameters of the valve operator assembly 1. According to a first example, the sensing device 25 may be an axial load cell sensor. The sensing device 25 transmits acquired data to the external control means wherein the data is analysed and interpreted. According to a second example, the sensing device 25 may be a torque cell sensor. According to a third example, the sensing device 25 consists in a vibration sensor from which we deduce frequency and then the velocity and the number of turns of the input member 6. Such a sensing device may be used for condition monitoring, efficiency assessment, preventive maintenance.

As an alternative not shown, the sensing device 25 may be integrated between the radial mounting surface 17h ending the tubular portion 17a of the spacing element 17 and the radial mounting surface 3d of the bonnet 3.

Figure 4A:
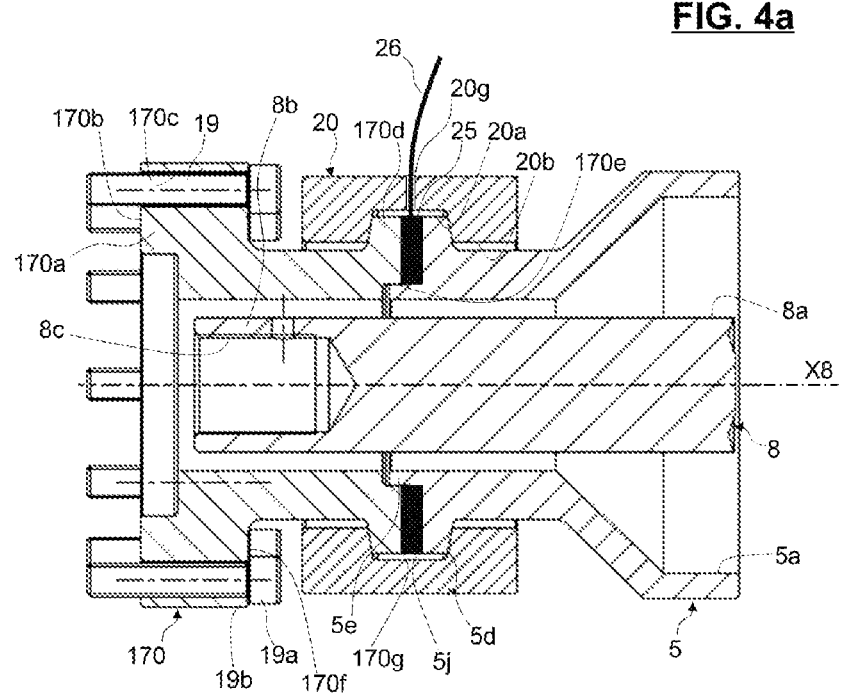
Figure 4B:
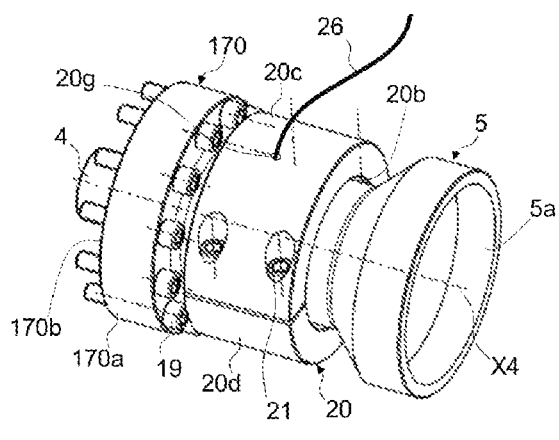
Figure 4C:
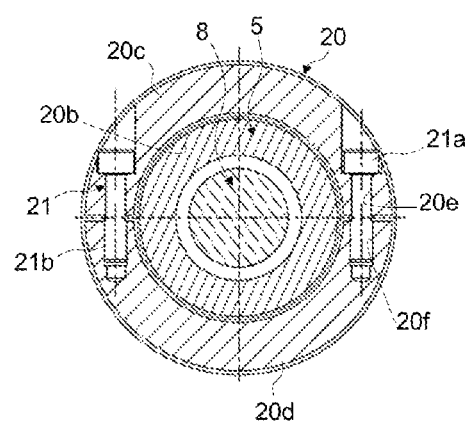

The second embodiment illustrated in FIGS. 4a to 4c, in which identical elements bear the same references, differs from the first embodiment of FIGS. 1a to 3 in that a spacing element 170 is connected to the bonnet 3 by a plurality of screws 19.

The spacing element 170 comprises a radial flange 170a defining a radial mounting surface 170b bearing against a radial mounting surface 3d of the bonnet 3. The said radial flange 170a comprises a plurality of holes 170c which are circumferentially equally spaced wherein screws 19 are engaged. The said screws 19 cooperate with associated threaded openings (not shown) provided on a radial surface of the bonnet 3. Each screw 19 comprises a screw head 19a defining a radial mounting surface 19b bearing against a radial mounting surface 170f of the flange 170a of the spacing element 170, said surface 170f being at the opposite side to the surface 170b bearing against the bonnet 3.

The second embodiment of the invention also differs from the first embodiment in that the spacing element 170 and the housing 5 each comprise radial flanges 170d, 5d respectively which are connected together by an annular ring 20.

The spacing element 170 comprises a second radial flange 170d disposed on an end on the opposite direction of the flange 170a connected to the bonnet 3. The radial flange 170d defines a radial mounting surface 170g bearing against a flange 5d of the housing 5 along a radial mounting surface 5j.

The housing 5 further comprises an axial tubular portion 5e that fits into an annular recess 170e of the spacing element 170, the said axial tubular portion 5e being radially surrounded by the annular recess 170e in order to ensure an axial guidance during the assembly of the housing 5 on the spacing element 170.

The valve operator assembly 1 further comprises an annular retainer ring 20 that connects the radial flanges 170d and 5d together. The annular retainer ring 20 comprises an inner bore 20b provided with an annular inner groove 20a wherein the two radial flanges 170d and 5d of the spacing element 170 and the housing 5 respectively bear against each other and are engaged. The groove 20a forms an axial abutment in both axial directions for the flanges 170d and 5d and then firmly maintains them.

The annular retainer ring 20 is split in two parts 20c and 20d for an easy mounting around the flanges 170d and 5d. It then comprises a first part 20c in a shape of a half-circle and a second part 20d in a shape of a half-circle.

The first part 20c comprises through holes 20e wherein screws 21 are engaged. Each through hole 20e comprises a shoulder forming an abutment for a screw head 21a. A screw threaded portion 21b perpendicularly extending from the said head 21a is engaged in the through hole 20e.

The second part 20d comprises threaded openings 20f that cooperates with the threaded portions 21b of the screws 21. A plurality of screws 21 may be arranged within associated through holes 20e on the first part 20c and threaded openings on the second part 20d of the annular retainer ring 20. In the example illustrated in FIGS. 4b and 4c, one can use 4 screws 21 to connect the two parts 20c, 20d of the annular retainer ring 20.

The valve operator assembly further comprises a sensing device 25 mounted between the radial mounting surface 170g of the flange 170d of the spacing element 170 and the radial mounting surface 5j of the flange 5d of the housing 5.

As shown in FIGS. 4a and 4b, the first part 20c of the annular retainer ring 20 comprises a through-hole 20g wherein a cable 26 is passing through. Said cable 26 is connected to the sensing device 25 for connecting it to external means.

As an alternative not shown, the sensing device may be integrated between the radial mounting surface 170b ending the spacing element 17 and the radial mounting surface 3d of the bonnet 3.

Figure 5A:
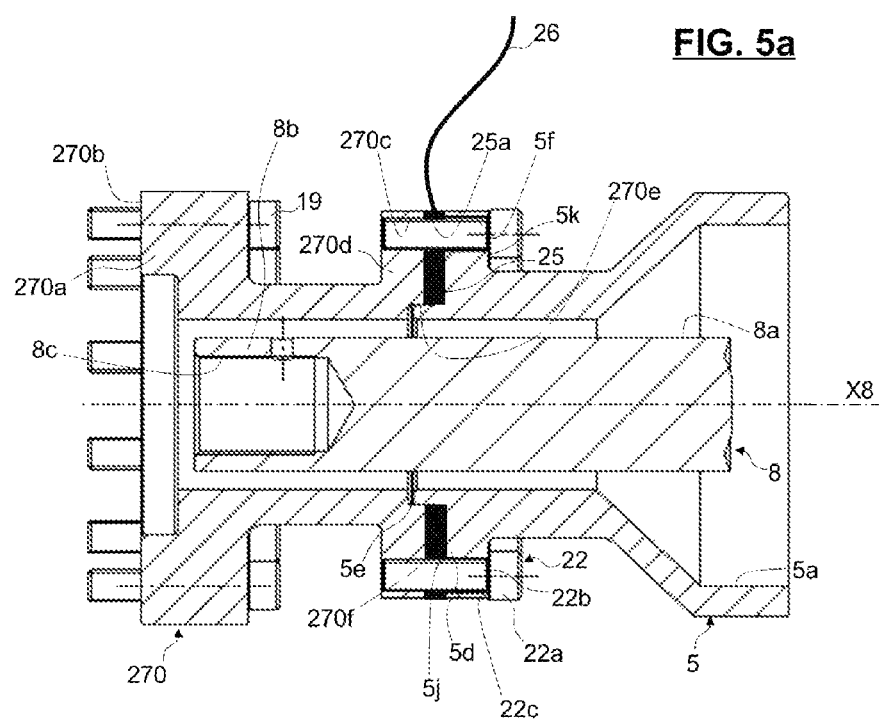
FIGS. 5a and 5b are detail views of a valve operator assembly for gate valve according to a third example of the invention.
Figure 5B:
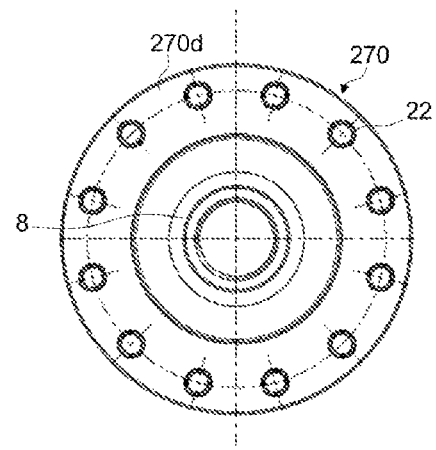

The third embodiment illustrated in FIGS. 5a and 5b, in which identical elements bear the same references, differs from the second embodiment of FIGS. 4a to 4c in that a spacing element 270 and the housing 5 each comprise radial flanges 270d, 5d respectively which are connected together by screws 22.

The spacing element 270 comprises a radial flange 270d defining a radial mounting surface 270f bearing against a flange 5d of the housing 5 along a radial mounting surface 5j. The flange 5d comprises a plurality of threaded holes 5f which are circumferentially equally spaced wherein screws 22 are engaged. The said screws 22 cooperate with associated threaded holes 270c provided on the radial flange 270d. More precisely, a screw head 22a defines a radial mounting surface 22c in abutment against a radial mounting surface 5k of the flange 5d, said surface 5k being at the opposite side to the surface 5j bearing against the flange 270d of the spacing element 270. The screw 22 further comprises a threaded portion 22b perpendicularly extending from said head 22a and engaged in the threaded holes 5f and 270c of the housing 5 and the spacing element 270 respectively.

In the example illustrated in FIG. 5b, one can use 12 screws 22 to connect the housing 5 and the spacing element 270.

The housing 5 further comprises an axial tubular portion 5e that fits into an annular recess 270e of the spacing element 270, the said axial tubular portion 5e being radially surrounded by the annular recess 270e in order to ensure an axial guidance during the assembly of the housing 5 on the spacing element 270.

The spacing element 270 further comprises a radial flange 270a disposed on an end on the opposite side of the flange 270d, said flange 270a defining a radial mounting surface 270b bearing against the radial mounting surface 3d of the bonnet 3. The said radial flange 270a comprises a plurality of holes 270c which are circumferentially equally spaced wherein screws 19 are engaged. The said screws 19 cooperate with associated threaded openings (not shown) provided on a radial surface of the bonnet 3.

The valve operator assembly further comprises a sensing device 25 integrated between the radial mounting surface 270f of the spacing element 270 and the radial mounting surface 5j of the housing 5. Said sensing device 25 comprises openings 25a wherein the threaded portions 22b of the screws 22 pass through.

As an alternative not shown, the sensing device may be integrated between the radial mounting surface 5k of the flange 5 of the housing 5 and the radial mounting surfaces 22c of the screw heads 22a. Such a sensing device may be annular with openings for inserting the screw threaded portions 22b. As an alternative, the sensing device consists in a plurality of annular devices supported by each screw.

As another alternative not shown, the sensing device may be integrated between the radial mounting surface 3d of the bonnet and the radial mounting surface 270b of the flange 270a of the spacing element 270.

Figure 6:
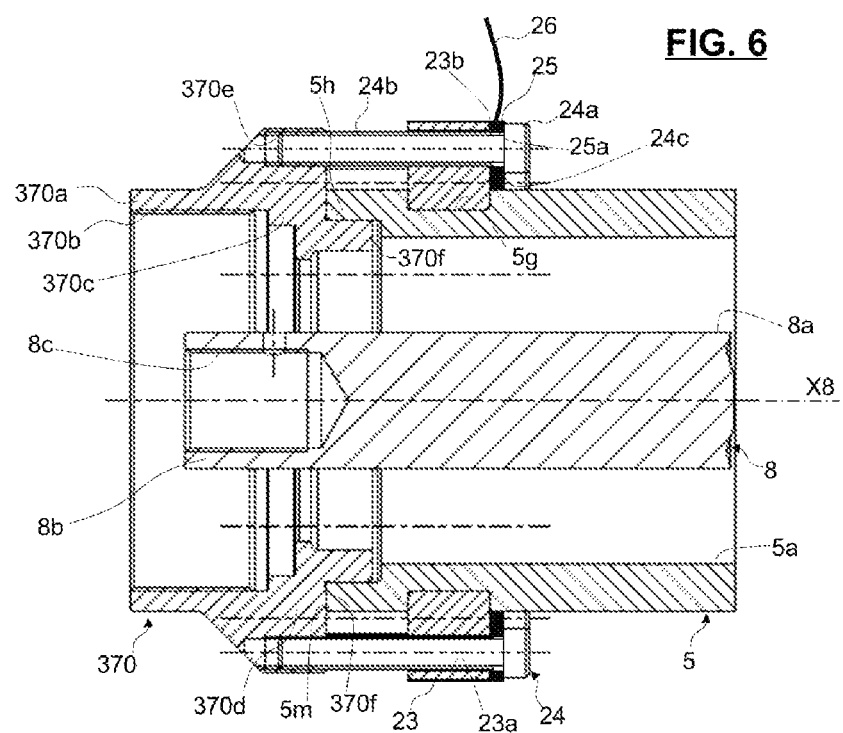
FIG. 6 is detail view of a valve operator assembly for gate valve according to a fourth example of the invention.

The fourth embodiment illustrated in FIG. 6, in which identical elements bear the same references, differs from the first embodiment of FIGS. 1a to 3 in that a spacing element 370 comprises a radial flange 370d and the housing 5 is provided with an annular ring 23, the radial flange 370d and the annular ring 23 being connected together by screws 24.

The spacing element 370 comprises a radial flange 370d that is provided with a plurality of threaded holes 370e.

The housing 5 comprises an outer groove 5g provided on an outer cylindrical surface of said housing 5, an annular ring 23 being engaged into said outer groove 5g. The annular ring 23 may be press fitted, mounted in force or split in two attached parts in order to be inserted in the outer groove 5g. The annular ring 23 comprises a plurality of through holes 23a that face the threaded holes 370e of the spacing element 370.

Screws 24 are inserted in the through holes 23a of the annular ring 23 and the threaded holes 370e of the spacing element 370 in order to connect them together. The screws 24 each comprise a head 24a defining a radial mounting surface 24c bearing against a radial mounting surface 23b of the annular ring 23. Each screw further comprises a threaded portion 24b that is extending from screw head 24a, is engaged in a through hole 23a and cooperate with a threaded hole 370e of the spacing element 370.

The spacing element 370 and the annular ring 23 are then firmly attached by said screws 24. Since the annular ring 23 is axially blocked in the outer groove 5g, the spacing element 370 and the housing 5 are then connected together.

The spacing element 370 comprises a tubular portion 370f from which the flange 370d radially outwardly extends, said tubular portion 370f cooperating with and being overlapped by a tubular portion 5h ending the housing 5 so as to ensure an axial guidance of the spacing element 370 and the housing 5. The tubular portion 5h ends with a radial mounting surface 5m that bears against a radial mounting surface 370f of the flange 370d.

Such a design permits to provide a housing 5 of simple design compared to a housing with a radial flange. It permits to reduce the material used for manufacturing such a housing and then to reduce the cost.

The valve operator assembly further comprises a sensing device 25 integrated between the radial mounting surface 23b of the annular ring 23 and the radial mounting surfaces 24c of the screw heads 24a. The sensing device 25 comprises openings 25a wherein the screw threaded portions 24b pass through. As an alternative not shown, the sensing device 25 is integrated between the radial mounting surface 5m of the housing 5 and the radial mounting surface 370f of the flange 370d of the spacing element 370.

The spacing element 370 further comprises a tubular portion 370a on the opposite side of the flange 370d. The tubular portion 370a is provided with a threaded inner cylindrical surface 370b that cooperates with a threaded outer cylindrical surface of a tubular portion of the valve bonnet (not shown but similar to the one if FIGS. 1a and 1b). An inner shoulder 370c in the inner bore defined by the tubular portion 370a forms an axial stop for the tubular portion of the valve bonnet. The tubular portions ensure an axial guidance during the assembly of the spacing element 370 on the bonnet 3.

Although the present invention has been illustrated using an inverted roller screw mechanism as transmission mechanism, it will be understood that the invention can be applied without major modification to valve operator assembly using any other type of transmission mechanism, such as recirculating roller screw mechanism, ball screw mechanism, friction screw mechanism.

Moreover, although the present invention has been illustrated using a plurality of single-row ball bearings, it will be understood that the invention can be applied without major modification to bearings using rolling elements that are not balls and/or that have several rows of rolling elements.

Although the invention has been illustrated on the basis of a valve operator assembly for gate valve, it should be understood that the invention can also be used with other types of valves, for instance control or regulation valves or choke valves. The valve operator assembly may be used for instance with a surface gate or a subsea valve gate which may be actuated by a remote operating vehicle or an actuator.

The embodiments disclosed in the description may be arranged or combined together and are still within the meaning of the present invention.

The invention claimed is:

1. A valve operator assembly for a valve comprising:
    a valve body,
    an axially moveable valve translating member,
    a housing adapted to be mounted on the valve,
    an input member rotatably mounted with respect to the housing, and
    a transmission mechanism having a translating element adapted to be connected to the valve translating member and a rotating element connected to the input member, the transmission mechanism being adapted to convert applied rotation of the input member into axial translation of translating element,
    a spacing element having a tubular shape defining an axial bore through which at least partly passes the valve translating member and the translating element of the transmission mechanism and adapted to be directly connected or indirectly connected by intermediate fixing means on the valve body on a first end and on the housing on a second end so as to define cooperating mounting surfaces between the spacing element, the valve body and/or the intermediate fixing means and between the spacing element, housing and/or the intermediate fixing means, and wherein the valve operator assembly further provides at least one sensing device disposed on one of the mounting surfaces.

2. The valve operator assembly according to claim 1, wherein the sensing device is connected to external means by at least one cable.

3. The valve operator assembly according to claim 2, wherein the annular retainer ring comprises passage means for enabling the passage of cables connected to the sensing device.

4. The valve operator assembly according to claim 1, the sensing device is integrated between two radial mounting surfaces that are outwardly opened to free space.

5. The valve operator assembly according to claim 1, wherein the sensing device is mounted between one mounting surface of the spacing element and one mounting surface of the housing.

6. The valve operator assembly according to claim 1, wherein the spacing element comprises a first tubular portion defining a first mounting surface cooperating with a second tubular portion defining a second mounting surface of the housing so as one of the first or second tubular portions is radially surrounding the other in order to ensure an axial guidance.

7. The valve operator assembly according to claim 6, wherein the spacing element or the housing comprises a radial portion forming an axial stop for the tubular portion of the housing or the spacing element respectively, the axial stop defining a radial mounting surface against which bears an almost radial mounting surface ending the tubular portion (5a, 5h).

8. The valve operator assembly according to claim 6, wherein the tubular portion of the spacing element is provided with a thread cooperating with an associated thread provided to the tubular portion of the housing.

9. The valve operator assembly according to claim 1, wherein the spacing element comprises a first radial annular flange defining a first radial mounting surface and the housing comprises a second radial annular flange defining a second radial mounting surface, and wherein both first and second annular flanges bear against each other.

10. The valve operator assembly according to claim 9, wherein the two flanges of the spacing element and the housing are connected together by a plurality screws such as each screw comprises a head screw defining a radial mounting surface bearing against a radial mounting surface defined on one of the flanges.

11. The valve operator assembly according to claim 9, wherein the two flanges of the spacing element and the housing are connected together by an annular retainer ring comprising an inner groove, wherein the two flanges are engaged and axially blocked.

12. The valve operator assembly according to claim 9, wherein the two flanges of the spacing element and the housing are bearing against each other along radial mounting surfaces.

13. The valve operator assembly according to claim 9, wherein at least one the flanges provided on the housing and/or the spacing element consists in an annular ring connected to the outer periphery of the housing and/or spacing element.

14. A valve, for a gate valve, a control or regulation valve or a choke valve comprising:
    a valve body provided with a valve bonnet, and
    a valve housing covered by the bonnet,
    an axially moveable valve translating member, and
    a valve operator assembly having
    a housing adapted to be mounted on the valve,
    an input member rotatably mounted with respect to the housing, and
    a transmission mechanism having a translating element adapted to be connected to the valve translating member and a rotating element connected to the input member, the transmission mechanism being adapted to convert applied rotation of the input member into axial translation of translating element,
    a spacing element having a tubular shape defining an axial bore through which at least partly passes the valve translating member and the translating element of the transmission mechanism and adapted to be directly connected or indirectly connected by intermediate fixing means on the valve body on a first end and on the housing on a second end so as to define cooperating mounting surfaces between the spacing element, the valve body and/or the intermediate fixing means and between the spacing element, the housing and/or the intermediate fixing means, and wherein
    the valve operator assembly further provides at least one sensing device disposed on one of the mounting surfaces,
    the valve translating member being a valve stem or a piston.

15. The valve according to claim 14, wherein the valve bonnet comprises a tubular portion provided with a thread on an cylindrical surface, the thread cooperating with an associated thread provided on an cylindrical surface of the spacing element.

* * * * *